(12) United States Patent
Faruque et al.

(10) Patent No.: US 12,606,002 B2
(45) Date of Patent: Apr. 21, 2026

(54) VEHICLE BATTERY ASSEMBLY

(71) Applicant: Ford Global Technologies, LLC, Dearborn, MI (US)

(72) Inventors: Mohammad Omar Faruque, Ann Arbor, MI (US); S.M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 299 days.

(21) Appl. No.: 18/459,671

(22) Filed: Sep. 1, 2023

(65) Prior Publication Data

US 2025/0074176 A1      Mar. 6, 2025

(51) Int. Cl.
| | |
|---|---|
| *B60K 1/04* | (2019.01) |
| *H01M 50/249* | (2021.01) |
| *H01M 50/262* | (2021.01) |

(52) U.S. Cl.
CPC ............. *B60K 1/04* (2013.01); *H01M 50/249* (2021.01); *H01M 50/262* (2021.01); *B60K 2001/0438* (2013.01)

(58) Field of Classification Search
CPC ............. B60K 1/04; B60K 2001/0438; H01M 50/249; H01M 50/262
USPC ....................................................... 180/68.5
See application file for complete search history.

(56) References Cited

U.S. PATENT DOCUMENTS

| | | | |
|---|---|---|---|
| 8,608,230 | B2 | 12/2013 | Young et al. |
| 9,045,030 | B2 * | 6/2015 | Rawlinson .............. B60L 50/66 |
| 9,108,497 | B2 | 8/2015 | Harrison, III et al. |
| 10,017,037 | B2 | 7/2018 | Newman et al. |
| 10,392,052 | B2 * | 8/2019 | Takahashi .............. B62D 21/07 |
| 10,483,510 | B2 * | 11/2019 | Stephens ............. H01M 50/249 |
| 10,632,857 | B2 * | 4/2020 | Matecki .................. B60L 50/64 |
| 10,960,748 | B2 * | 3/2021 | Matecki ............. H01M 50/233 |
| 11,211,656 | B2 * | 12/2021 | Matecki ............. H01M 50/271 |
| 11,214,137 | B2 * | 1/2022 | Stephens ................. B60L 50/66 |
| 11,485,214 | B2 | 11/2022 | Baccouche et al. |
| 11,688,910 | B2 * | 6/2023 | Stephens ................. B60L 50/64 429/96 |
| 11,801,741 | B2 * | 10/2023 | Zandbergen ............ B60L 50/64 |
| 2013/0206496 | A1 * | 8/2013 | Hashimoto ............ B62D 21/12 180/291 |
| 2020/0384842 | A1 * | 12/2020 | Qin .......................... B60K 1/04 |
| 2021/0016649 | A1 * | 1/2021 | Sasmaz ............... H01M 50/262 |
| 2022/0006150 | A1 * | 1/2022 | Foran .................. H01M 50/227 |
| 2022/0059892 | A1 * | 2/2022 | Matecki ................ H01M 50/20 |
| 2022/0234433 | A1 * | 7/2022 | Falls ................... H01M 50/209 |
| 2022/0250684 | A1 | 8/2022 | Renegar |
| 2022/0379706 | A1 * | 12/2022 | Hiramatsu ............ B62D 21/11 |
| 2023/0095797 | A1 * | 3/2023 | Moussu .................... E01B 3/46 |

FOREIGN PATENT DOCUMENTS

| | | |
|---|---|---|
| CN | 212182383 U | 12/2020 |

\* cited by examiner

*Primary Examiner* — Hau V Phan

(74) *Attorney, Agent, or Firm* — Frank A. MacKenzie; Brooks Kushman P.C.

(57) ABSTRACT

A vehicle includes a frame including a pair of spaced apart longitudinal members extending along a vehicle-longitudinal axis. Multiple cross-members extend transverse to the vehicle-longitudinal axis and are fastened at each end to a corresponding one of the pair of longitudinal members. A battery tray is positioned above the multiple cross-members and positioned between the longitudinal members.

20 Claims, 6 Drawing Sheets

VEHICLE BATTERY ASSEMBLY

BACKGROUND

A battery-electric vehicle includes battery cells that power the vehicle, including propulsion of the vehicle. For example, wheels of the vehicle are powered by electric motors that are powered by the battery cells. As one example, the battery cells may be pouch cells having a flexible outer bag and electrodes, e.g., conductive foil tabs, that extend through the flexible outer bag. In such an example, the battery cells are stacked in a battery compartment of a battery tray.

DETAILED DESCRIPTION

Figure 1:
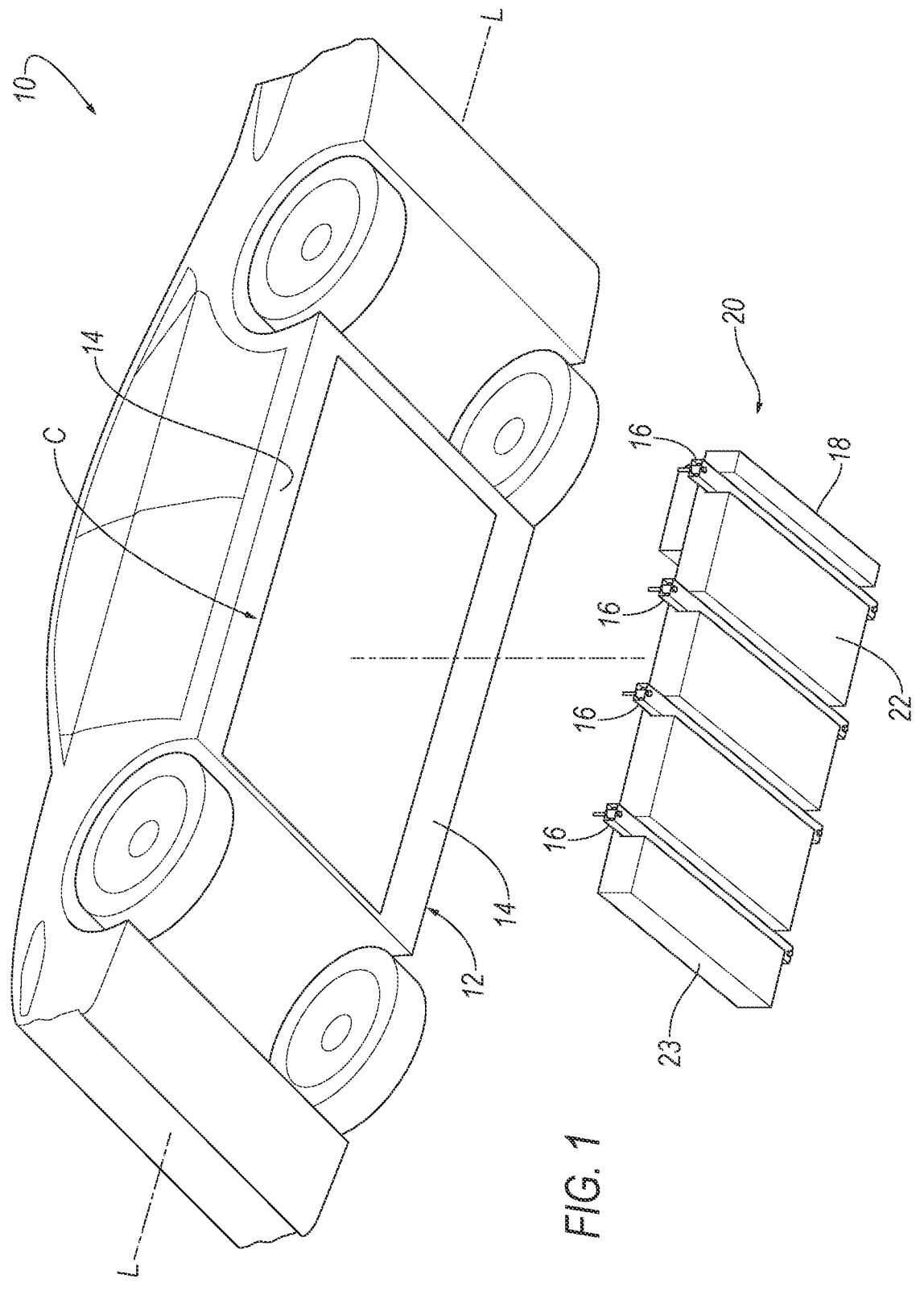
FIG. 1 is a partially exploded perspective view of a vehicle battery assembly and a vehicle.

A vehicle includes a frame including a pair of spaced apart longitudinal members extending along a vehicle-longitudinal axis. Multiple cross-members extend transverse to the vehicle-longitudinal axis and are fastened at each end to a corresponding one of the pair of longitudinal members. A battery tray is positioned above the multiple cross-members and positioned between the longitudinal members.

The vehicle may include a fastening element attached to the battery tray and one of the multiple cross-members. The fastening element may be frangible relative to the battery tray and the cross-member. The battery tray may have a bottom surface and channels in the bottom surface. The cross-members may be in the channels, and the fastening element may be in the channel. The fastening element may be adhesive designed to separate from the battery tray and/or the cross-member when subjected to a shear-force in a cross-vehicle direction above a predetermined value. The vehicle may include a cross-vehicle space between the longitudinal members and the battery tray.

The fastening element may be adhesive. The adhesive may be designed to separate from the battery tray and/or the cross-member when subjected to a shear-force in a cross-vehicle direction above a predetermined value.

The battery tray may have a bottom surface and channels in the bottom surface. The cross-members may be in the channels. The cross-members may be below the longitudinal members. The vehicle may include fasteners extending upwardly through the cross-members and into the longitudinal members. The vehicle may include a cross-vehicle space between the longitudinal members and the battery tray.

The longitudinal members may be spaced apart a frame distance and wherein the battery tray has a width less than the frame distance. The vehicle may include a cross-vehicle space between the battery tray and each longitudinal member. It may be that there are no structures positioned between the sides of the battery tray and the longitudinal members.

Selected ones of the multiple cross-members are filled with expandable foam. The frame may be a unibody construction.

A vehicle battery assembly includes a battery tray having a longitudinal axis, a bottom surface, and multiple channels in the bottom surface. Multiple cross-members extend transverse to the longitudinal axis, and each positioned in a corresponding one of the multiple channels. A fastening element is attached to the battery tray and one of the vehicle cross-members. The fastening element may be frangible relative to the battery tray and the cross-member.

The battery tray may be above the cross-members. The fastening element may be adhesive. The adhesive may be designed to separate from the battery tray and/or the cross-member when subjected to a shear-force in a transverse direction above a predetermined value.

The cross-members may be tubular and further comprise spacers positioned inside the cross-member at both ends.

With reference to the Figures, wherein like numerals indicate like parts throughout the several views, a vehicle 10 includes a frame 12 including a pair of spaced apart longitudinal members 14 extending along a vehicle-longitudinal axis L. Multiple cross-members 16 extend transverse to the vehicle-longitudinal axis and are fastened at each end to a corresponding one of the pair of longitudinal members 14. A battery tray 18 is positioned above the multiple cross-members 16 and between the longitudinal members 14. The vehicle may include a cross-vehicle space 26 between the longitudinal members 14 and the battery tray 18. The battery tray 18 and the cross-members 16 are attached to each other with one or more frangible fastening elements 30/32 designed to separate from the battery tray 18 and/or the cross-member 16 when subjected to a shear-force in a cross-vehicle direction C above a predetermined value. The predetermined value may be associated with certain side impacts. For example, the fastening elements 30/32 may be designed to separate from the battery tray 18 and/or the cross-member 16 at a cross-vehicle shear-force of approximately 5-10 kN.

The cross-vehicle spaces 26 between the longitudinal members 14 and the battery tray 18 accommodate for cross-vehicle movement of the longitudinal members 14 relative to the battery tray 18 during certain vehicle side impacts. The cross-vehicle spaces 26 provide a limited amount of cross-vehicle movement of the battery tray 18 relative to the vehicle frame 12 during certain vehicle impacts. The battery tray 18 is captured in the vehicle frame 12 because the battery tray 18 sits between the vehicle 10 and the cross-members 16. The frangible fasteners 30/32 are designed to release, allowing the battery tray 18 to move away from an intruding pole, vehicle, or other structure while remaining contained in the vehicle 10 between the vehicle 10 and the cross-members 16. The cross-members 16 may increase torsional stiffness of the vehicle 10. Cross-members 16 can transfer impact energy cross-vehicle to the opposite longitudinal member 14 during certain vehicle impacts.

With reference to FIG. 1, the vehicle 10 includes a vehicle frame 12. The vehicle frame 12 may be of a unibody construction in which the frame is unitary with a vehicle body (including longitudinal members 14, pillars, roof rails, etc.). As another example, the body and frame may have a body-on-frame construction (also referred to as a cab-on-frame construction) in which the body and frame are separate components, i.e., are modular, and the body is supported on and affixed to the frame. Alternatively, the frame and body may have any suitable construction. The frame and body may be of any suitable material, for example, steel, aluminum, and/or fiber-reinforced plastic, etc. In any construction, the vehicle 10 may include the longitudinal members 14. Architectural components of the vehicle 10, e.g., pillars, body panels, bumpers, etc., may be connected directly to and/or supported on the longitudinal members 14.

As set forth above, the vehicle 10 includes the vehicle longitudinal axis L. The vehicle-longitudinal direction extends fore-and-aft along the direction of travel of the vehicle 10. The vehicle 10 also includes a cross-vehicle direction C that is transverse to the vehicle longitudinal axis L.

The vehicle 10 is a battery-electric vehicle. In other words, propulsion of the vehicle 10 is powered electrically by a vehicle battery assembly 20 having one or more battery modules. For example, the wheels of the vehicle 10 are powered by electric motors. The vehicle 10 may be of any type, e.g., a passenger automobile, taxi, ride-sharing automobile, etc.

The vehicle battery assembly 20 includes the battery tray 18 and the cross-members 16. The battery tray 18 may include at least one battery module contained in the tray 18. For example, the vehicle battery assembly 20 shown in FIG. 1 may include five battery modules. In examples including multiple battery modules, adjacent ones of the battery modules are connected to each other. Each battery module may include one or more battery cells. The battery tray 18 may be rectangular, or any suitable shape. The battery tray 18 may include panels free of any openings. The battery tray 18 may include one or more openings (not shown). The battery tray 18 may be metal or any suitable material. The battery tray 18 may include a battery compartment that receives the battery modules. The vehicle battery assembly 20 may include any suitable hardware, e.g., wiring, connectors, circuits, etc., connecting the battery modules to each other and to electrified components of the vehicle 10.

As set forth above, the longitudinal members 14 are elongated along an axis, e.g., the vehicle longitudinal axis A. The longitudinal members 14 may be parallel to each other. The longitudinal members 14 may be, for example, steel, aluminum, composite, etc. A floor of the vehicle 10, i.e., the floor of the passenger compartment, may be connected directly to the members 14, e.g., by fasteners and/or welding. The floor may support, for example, seats for occupants.

The battery tray 18 may include a bottom panel 22 and/or a top panel 25 (FIG. 4A) with a surrounding sidewall 23 extending therebetween. The bottom panel 22 and the top panel 25 may be fixed to the surrounding sidewall 23 to enclose the battery modules. In such an example, the battery compartment is defined between the bottom panel 22 and the top panel 25 and the surrounding sidewall 23. The bottom panel 22 faces the road surface and may be exposed to the road surface and prevent intrusion of precipitation and dirt to the battery tray 18. The top panel 25 may separate the battery compartment from components of the vehicle 10 above the vehicle battery assembly 20, e.g., a passenger compartment. The bottom panel 22 and the top panel 25 may be fixed to the surrounding sidewall 23, e.g., by fasteners and/or welding. The surrounding sidewall 23, bottom panel 22, and top panel 25 may be sealed to each other such that the battery compartment is environmentally sealed, i.e., to prevent intrusion of road precipitation and dirt.

Figure 2:
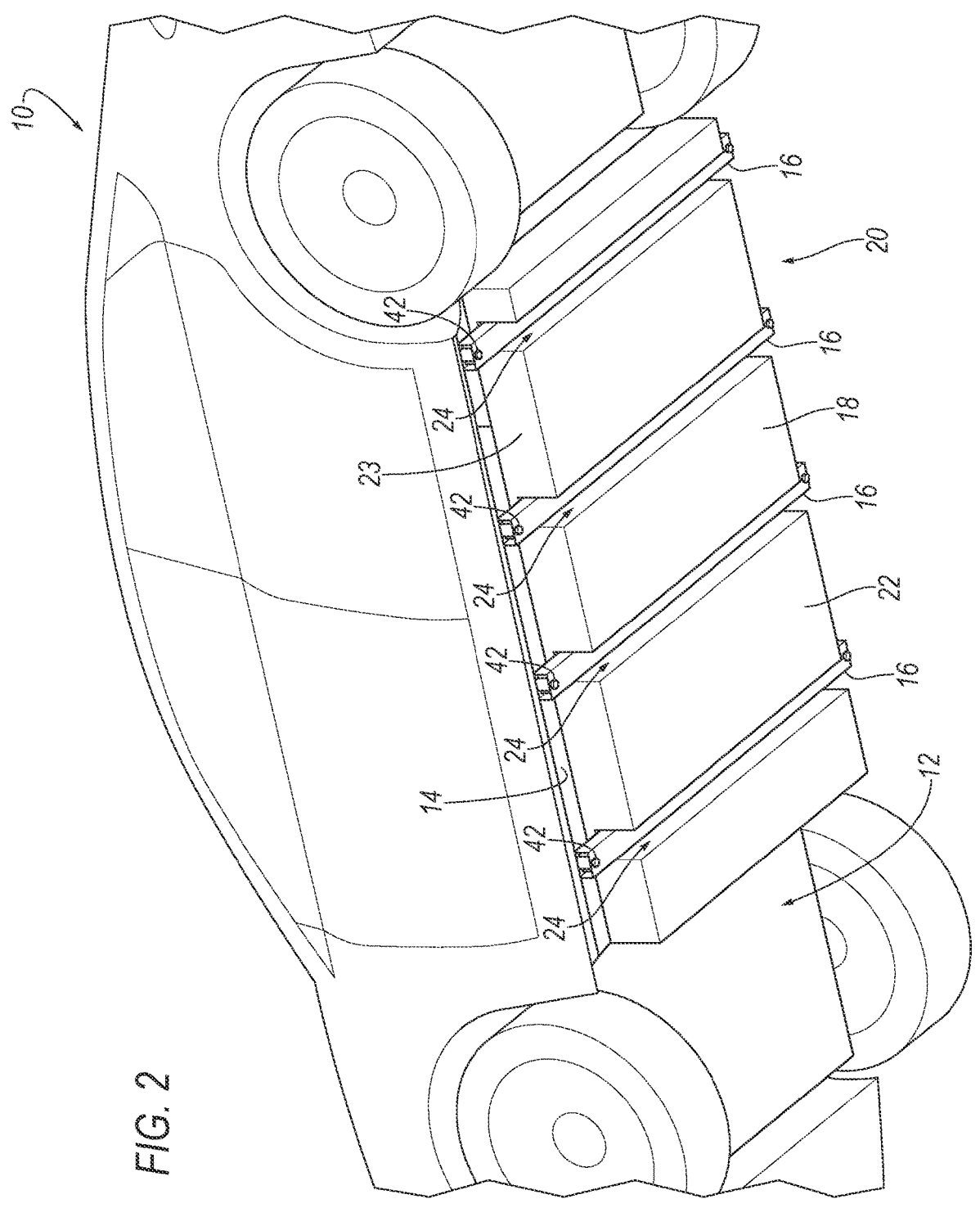
FIG. 2 is a perspective view of the vehicle battery assembly secured to the vehicle.
Figure 3:
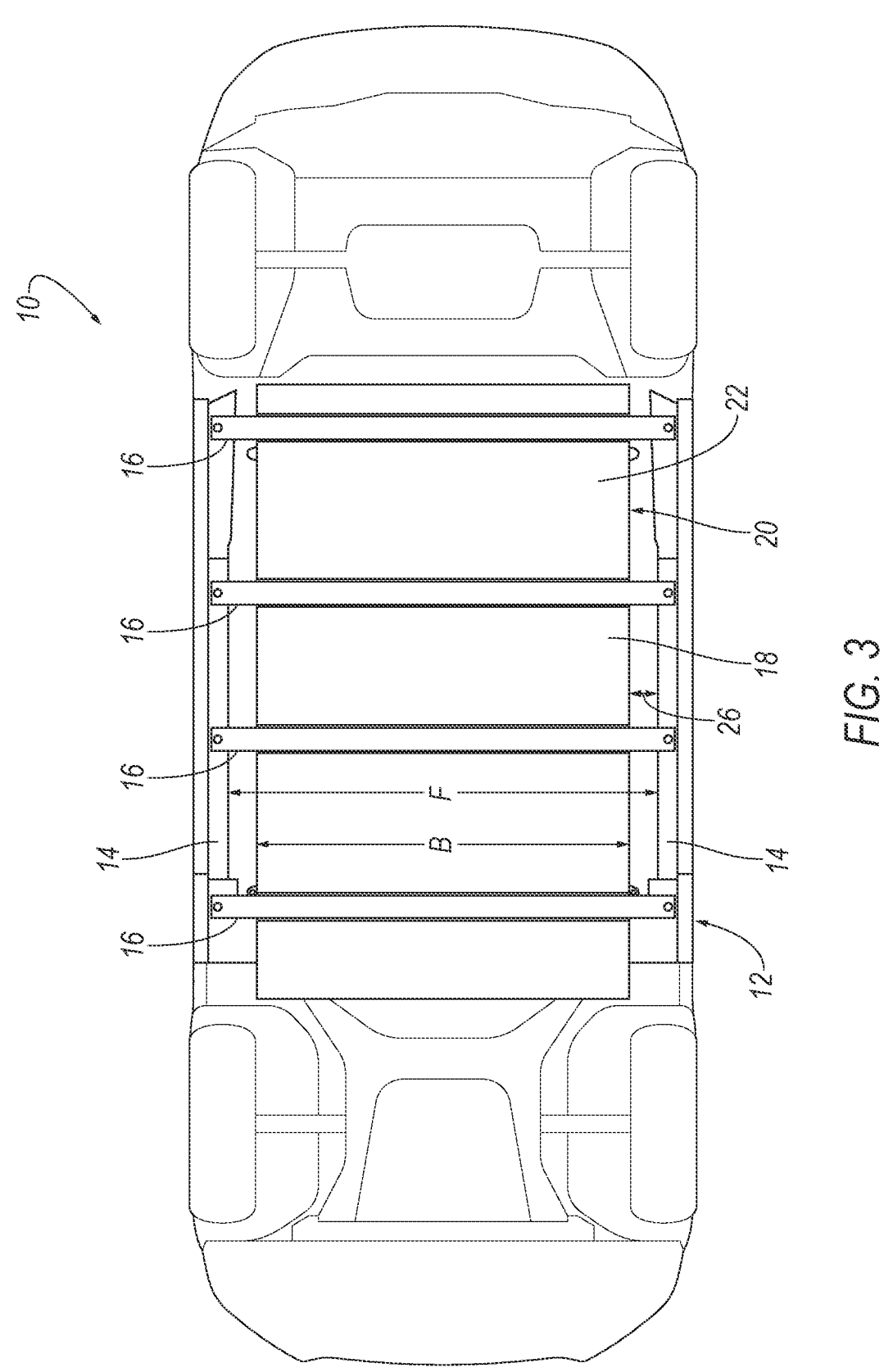
FIG. 3 is a bottom view of the vehicle and vehicle battery assembly including four transverse cross-members.

With reference to FIGS. 2 and 3, the battery tray 18 may have multiple channels 24 formed in the bottom surface 22 of the battery tray 18. The cross-members 16 may be positioned in the channels 24. The cross-members may be positioned below the longitudinal members and fastened thereto with suitable fasteners, such as bolts 42. The cross-members 16 extend below and abut the bottom of the longitudinal members 14. The fasteners 42 are elongated generally vertically. The fasteners 42 go through the bottom surface of the longitudinal members 14. The battery assembly 20 may be bolted directly to the longitudinal members 14.

The vehicle may include cross-vehicle spaces 26 between the longitudinal members 14 and the battery tray 18. The longitudinal members 14 are spaced apart a frame distance F and the battery tray has a width B which is less than the frame distance F providing a cross-vehicle space 26 between the battery tray 18 and each longitudinal member 14. In the depicted example, there are no structures positioned in the cross-vehicle spaces 26, i.e., between the sides of the battery tray 18 and the longitudinal members 14.

Figure 4A:
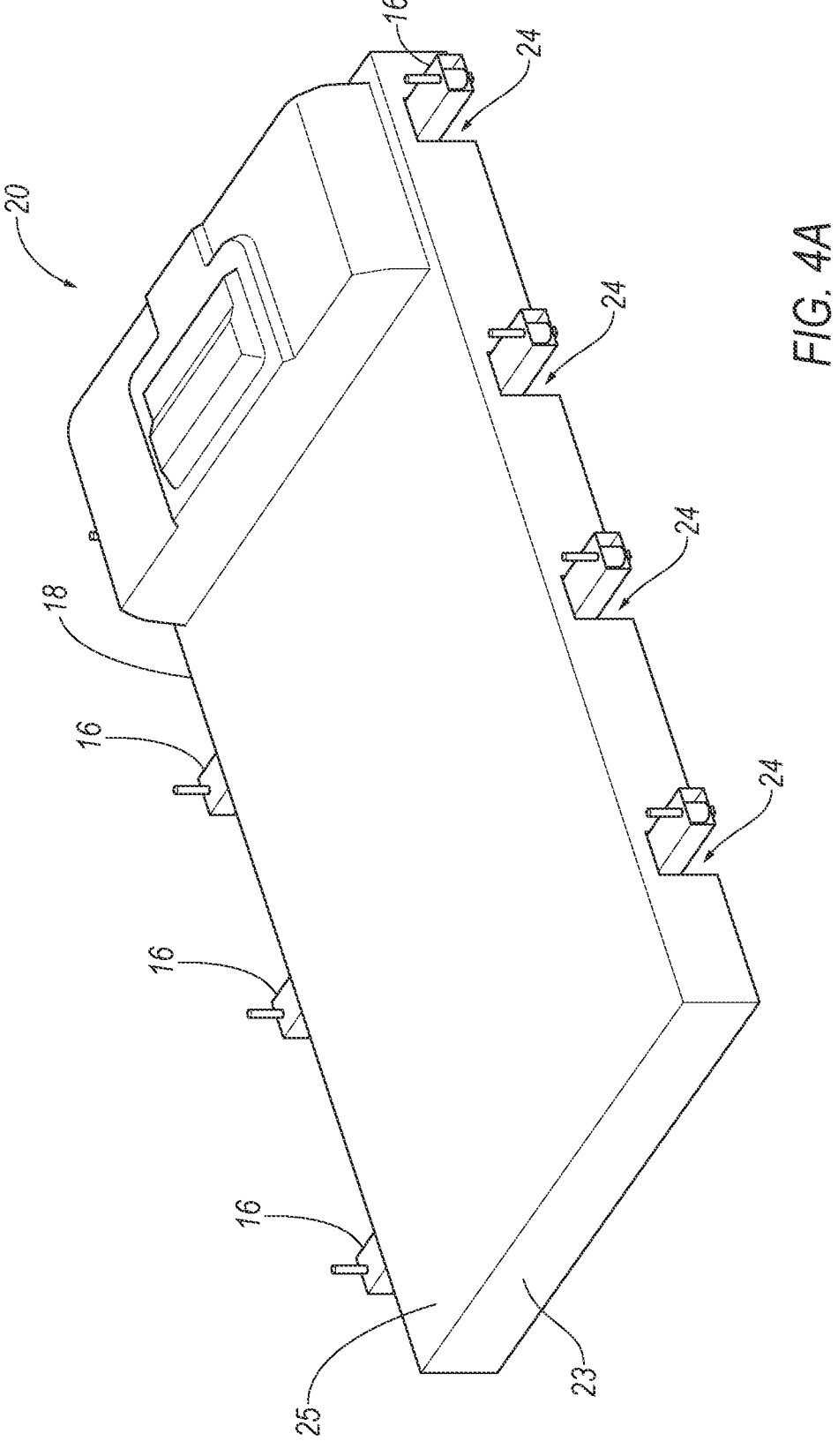
FIG. 4A is a perspective view of the vehicle battery assembly as viewed from above.
Figure 4B:
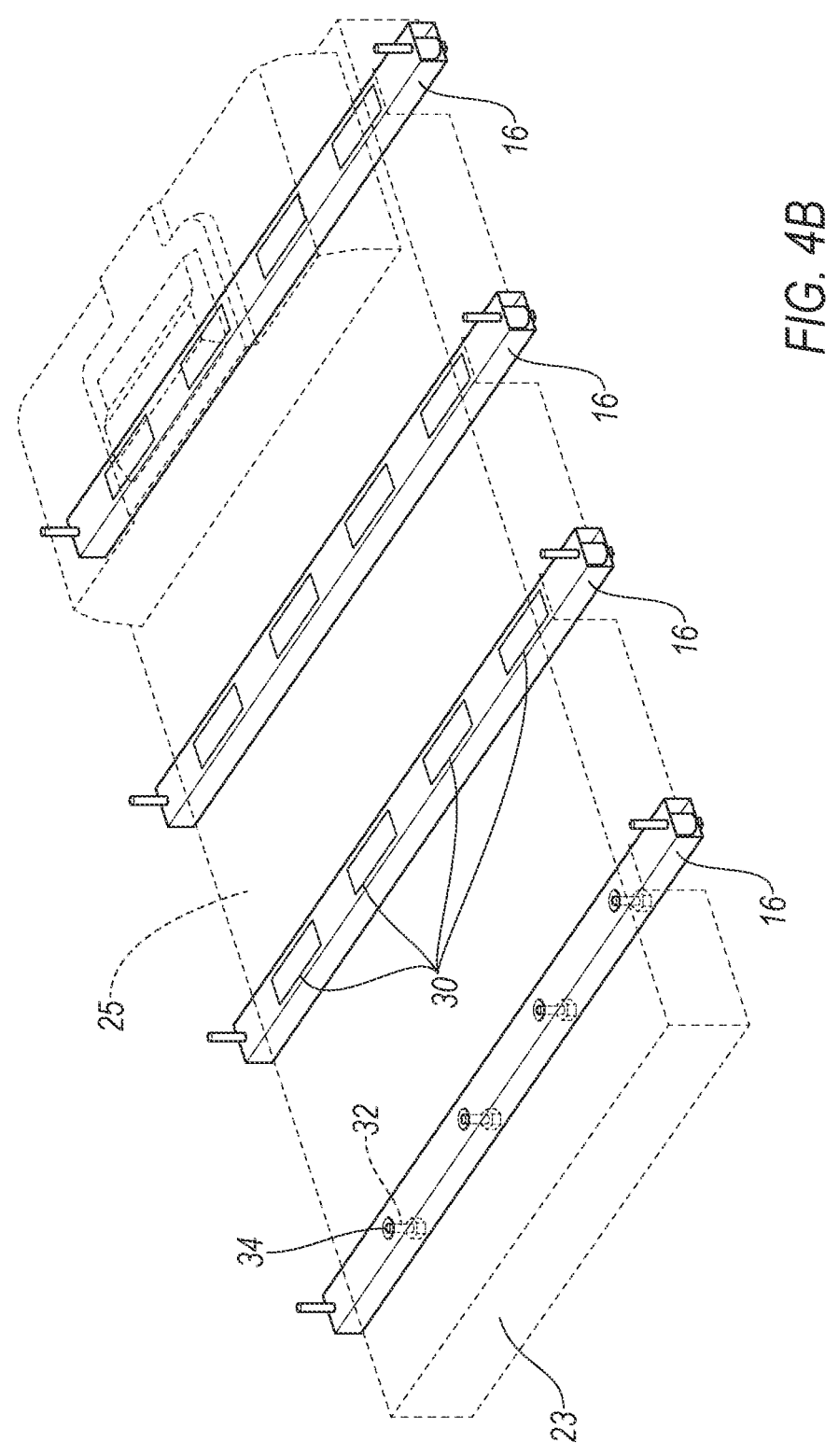
FIG. 4B is a partially transparent perspective view of the vehicle battery assembly shown in FIG. 4A.

With reference to FIGS. 4A and 4B, the vehicle 10 may include fastening elements 30/32 attached to the battery tray 18 and corresponding vehicle cross-members 16. The fastening elements 30/32 may be positioned in the channels 24 between the battery tray 18 and corresponding cross-members 16. The fastening elements 30/32 may be frangible relative to the battery tray 18 and the cross-member 16. In an example, the fastening elements may be adhesive patches 30 designed to separate from the battery tray 18 and/or the cross-member 16 when subjected to a shear-force in a cross-vehicle direction C above a predetermined value. The adhesive 30 may be any suitable adhesive, such as polymeric adhesives like polyamides, polyesters, ethylene-vinyl acetate, polyurethanes, and a variety of block copolymers and elastomers such as butyl rubber, ethylene-propylene copolymer, and styrene-butadiene rubber, for example. In another example, the fastening elements can be frangible screws 32 that extend through the cross-member 16 and engage a mating nut 34 fixed to the bottom panel 22. The nuts 34 can be weld-nuts or self-clinching nuts, for example. The frangible screws 32 may be metal, plastic, or composite. The frangible screws 32 may have varying cross-sectional dimensions to provide a designed resistance to shearing, beyond which the fastener shears and releases the battery tray 18 to move relative to the cross-members 16. The fastening elements may be plastic rivets, panel fasteners, and the like. The fastening elements may be shearable bolts, tabs, etc. The fastening elements may comprise cooperative hook and loop materials.

Figures 5, 6:
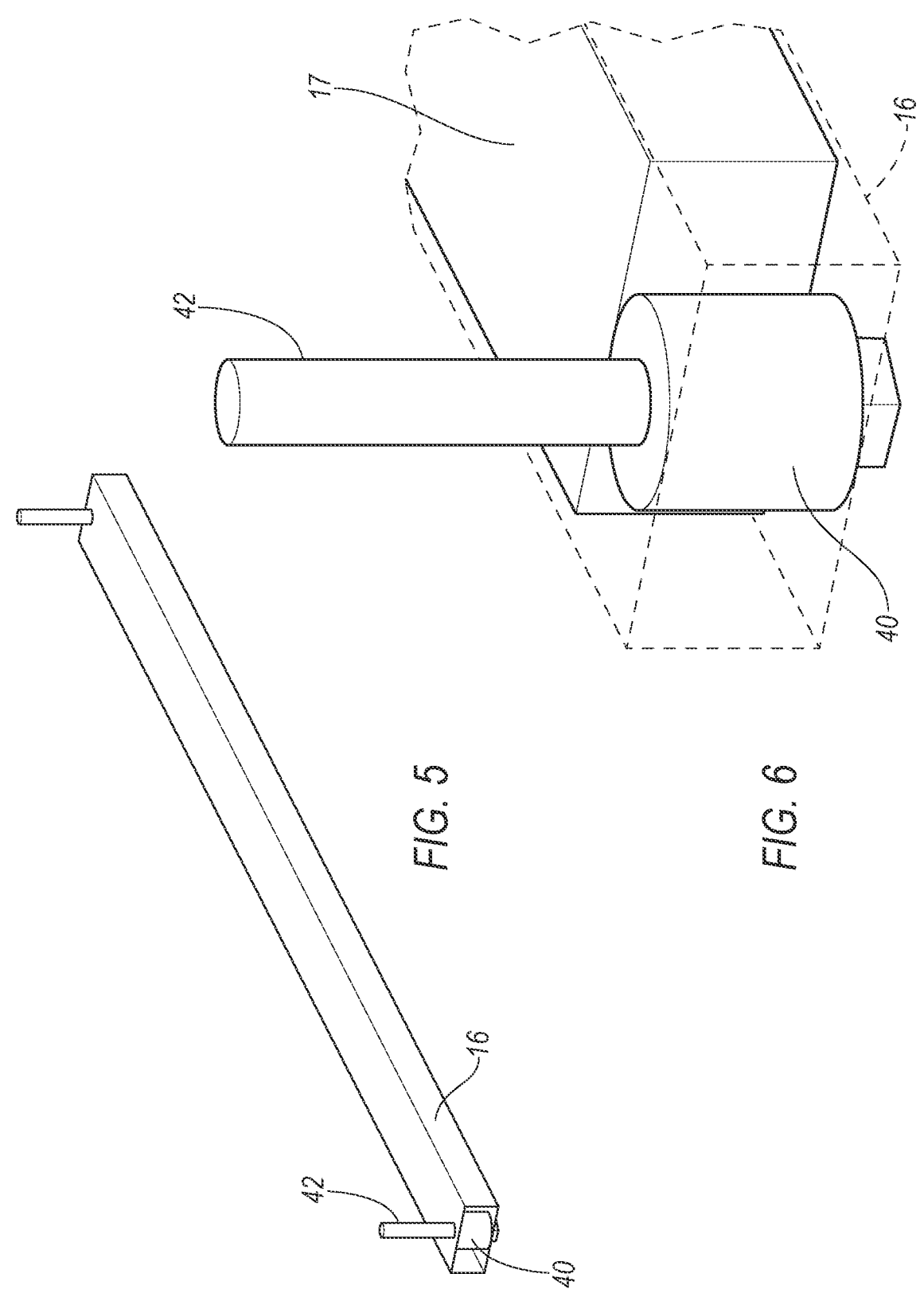
FIG. 5 is a perspective view of the cross-members shown in FIGS. 1-4B.
FIG. 6 is a magnified view of an end portion of the cross-member shown in FIG. 5.

With reference to FIGS. 5 and 6, the cross-members 16 may be tubular (e.g., rectangular tube) and may be filled with expandable foam 17 to further strengthen the cross-members 16, for example. Cross-members 16 may include spacers 40 positioned inside the cross-members 16 at both ends. The spacers 40 can help prevent the ends of the cross-members 16 from collapsing under compression from the bolts 42. The spacers 40 may be aligned with through holes formed in the ends of the cross-members 16 and configured to receive the bolts 42 therethrough. The spacers 40 may be positioned in an enclosed gap of the cross-members 16 and abuts an inner surface of the top and bottom panels of the cross-member 16. The spacers 40 may be metal, plastic, composite, or any suitable material.

During certain vehicle impacts, e.g., certain side vehicle impacts, the fastening elements 30/32 can release so that the channels 24 slide along the cross-members 16 so that the battery tray 18 moves laterally within cross-vehicle spaces 26 toward the frame 12 (e.g., longitudinal members 14) in the range of approximately 5-10 mm, and the battery tray 18 is retained in the frame 12. The cross-members 16 remain fixed to the longitudinal members 14 in order to retain the battery tray 18 in the frame 12 and to transfer impact energy cross-vehicle to the opposite longitudinal member 14 during certain vehicle impacts.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
   a frame including a pair of spaced apart longitudinal members extending along a vehicle-longitudinal axis;
   multiple cross-members extending transverse to the vehicle-longitudinal axis and fastened at each end to a corresponding one of the pair of longitudinal members;
   a battery tray positioned above the multiple cross-members and positioned between the longitudinal members; and
   a fastening element attached to the battery tray and one of the multiple cross-members, the fastening element being frangible relative to the battery tray and the cross-member.

2. The vehicle as set forth in claim 1, wherein the battery tray has a bottom surface and channels in the bottom surface, the cross-members being in the channels, and the fastening element being in a corresponding one of the channels.

3. The vehicle as set forth in claim 2, wherein the fastening element is adhesive, and the adhesive is designed to separate from the battery tray and/or the cross-member when subjected to a shear-force in a cross-vehicle direction above a predetermined value.

4. The vehicle as set forth in claim 3, further comprising a cross-vehicle space between the longitudinal members and the battery tray.

5. The vehicle as set forth in claim 1, wherein the fastening element is adhesive.

6. The vehicle as set forth in claim 5, wherein the adhesive is designed to separate from the battery tray and/or the cross-member when subjected to a shear-force in a cross-vehicle direction above a predetermined value.

7. The vehicle as set forth in claim 1, wherein the battery tray has a bottom surface and channels in the bottom surface, the cross-members being in the channels.

8. The vehicle as set forth in claim 7, wherein the cross-members are below the longitudinal members.

9. The vehicle as set forth in claim 8, further comprising fasteners extending upwardly through the cross-members and into the longitudinal members.

10. The vehicle as set forth in claim 9, further comprising a cross-vehicle space between the longitudinal members and the battery tray.

11. The vehicle as set forth in claim 1, wherein the longitudinal members are spaced apart a frame distance and wherein the battery tray has a width less than the frame distance and further comprising a cross-vehicle space between the battery tray and each longitudinal member.

12. The vehicle as set forth in claim 11, wherein there are no structures positioned between the battery tray and the longitudinal members.

13. The vehicle as set forth in claim 1, wherein selected ones of the multiple cross-members are filled with expandable foam.

14. The vehicle as set forth in claim 1, wherein the frame comprises a unibody construction.

15. A vehicle battery assembly comprising:
   a battery tray having a longitudinal axis, a bottom surface, and multiple channels in the bottom surface;
   multiple cross-members extending transverse to the longitudinal axis, each cross-member being positioned in a corresponding one of the multiple channels;
   the battery tray is above the cross-members; and
   adhesive attached to the battery tray and one of the multiple cross-members, the adhesive being frangible relative to the battery tray and the cross-member.

16. The vehicle battery assembly as set forth in claim 15, wherein the adhesive is designed to separate from the battery tray and/or the cross-member when subjected to a shear-force in a transverse direction above a predetermined value.

17. The vehicle battery assembly as set forth in claim 15, wherein the cross-members are tubular and include spacers positioned inside the cross-members at both ends of the cross-members.

18. A vehicle, comprising:
   a frame including a pair of spaced apart longitudinal members extending along a vehicle-longitudinal axis;
   multiple cross-members extending transverse to the vehicle-longitudinal axis and fastened at each end to a corresponding one of the pair of longitudinal members;
   a battery tray positioned above the multiple cross-members and positioned between the longitudinal members;
   the battery tray having a bottom surface and channels in the bottom surface, the cross- members being in the channels;
   the cross-members being below the longitudinal members; and
   fasteners extending upwardly through the cross-members and into the longitudinal members.

19. The vehicle as set forth in claim 18, further comprising a fastening element attached to the battery tray and one of the multiple cross-members, the fastening element being frangible relative to the battery tray and the cross-member.

20. The vehicle as set forth in claim 19, wherein the battery tray has a bottom surface and channels in the bottom surface, the cross-members being in the channels, and the fastening element being in a corresponding one of the channels.

* * * * *